United States Patent
Inoue

(10) Patent No.: US 6,842,165 B2
(45) Date of Patent: Jan. 11, 2005

(54) DISPLAY DEVICE AND RECORDING MEDIUM

(75) Inventor: Satoshi Inoue, Nagano (JP)

(73) Assignee: Seiko Epson Corporation (JP)

( * ) Notice: Subject to any disclaimer, the term of this patent is extended or adjusted under 35 U.S.C. 154(b) by 200 days.

(21) Appl. No.: 09/866,861

(22) Filed: May 29, 2001

(65) Prior Publication Data
US 2002/0036616 A1 Mar. 28, 2002

(30) Foreign Application Priority Data

May 26, 2000 (JP) ........................................ 2000-157050

(51) Int. Cl.⁷ .............................................. G09G 3/34
(52) U.S. Cl. ...................................... 345/107; 359/296
(58) Field of Search ........................... 345/107, 87, 89; 359/296

(56) References Cited

U.S. PATENT DOCUMENTS

| | | | | |
|---|---|---|---|---|
| 5,627,561 A | * | 5/1997 | Laspina et al. | 345/107 |
| 6,094,184 A | * | 7/2000 | Okamoto | 345/89 |
| 6,130,773 A | * | 10/2000 | Jacobson et al. | 359/296 |
| 6,480,182 B2 | * | 11/2002 | Turner et al. | 345/107 |
| 6,531,997 B1 | * | 3/2003 | Gates et al. | 345/107 |

FOREIGN PATENT DOCUMENTS

| | | |
|---|---|---|
| EP | 0 525 852 | 7/1992 |
| EP | 1 000 741 | 10/1999 |
| JP | 3-213827 | 9/1991 |
| JP | 10-48673 | 2/1998 |
| JP | 10-232641 | 9/1998 |
| JP | 11-265167 | 9/1999 |
| WO | WO 93/02443 | 7/1991 |

OTHER PUBLICATIONS

P. Drzaic et al., "44.3L: A Printed and Rollable Bistable Electronic Display", SID 98 Digest, pp. 1131–1134.
H. Kawai et al., "53.3: Micorencapsulated Electrophoretic Rewritable Sheet", SID 99 Digest, pp. 1102–1105.

* cited by examiner

*Primary Examiner*—Regina Liang
(74) *Attorney, Agent, or Firm*—Harness, Dickey & Pierce, P.L.C.

(57) ABSTRACT

Provided is a display device employing electronic ink capable of retaining the function of maintaining information displayed by the electronic ink, preventing the deterioration of the picture quality of the display information, and realizing the rewriting of display contents of pixels to be of a required minimum upon renewing the display contents. This display device (1) has a switching element containing a pixel unit 2A in which disposed is a microcapsule filled with liquid having charged particles dispersed therein, and a data writing circuit (4, 2B) for writing data by applying voltage to each pixel of the pixel unit 2A. This display device also has a refresh circuit (4) for refreshing at prescribed intervals the data of each pixel of the pixel unit 2A written pursuant to such data writing circuit (4, 2B). The writing circuit (4, 2B) has a TFT built in the switching element for turning the data writing on/off, and a driver for controlling the on/off of this TFT, wherein the driver (2B) is structured so as to be driven with a decoder method.

16 Claims, 13 Drawing Sheets

FIG.4
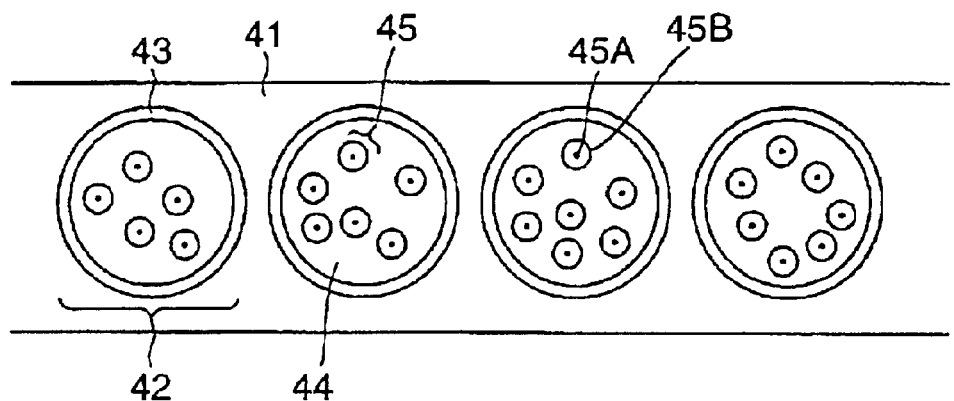
(A)
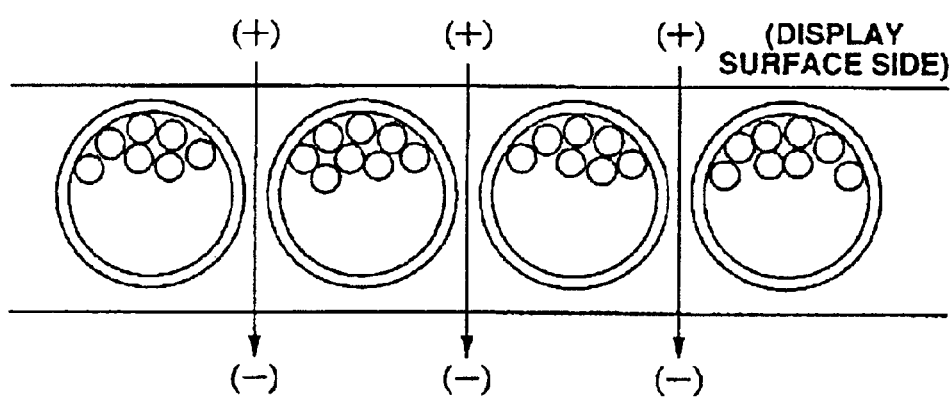
(B)
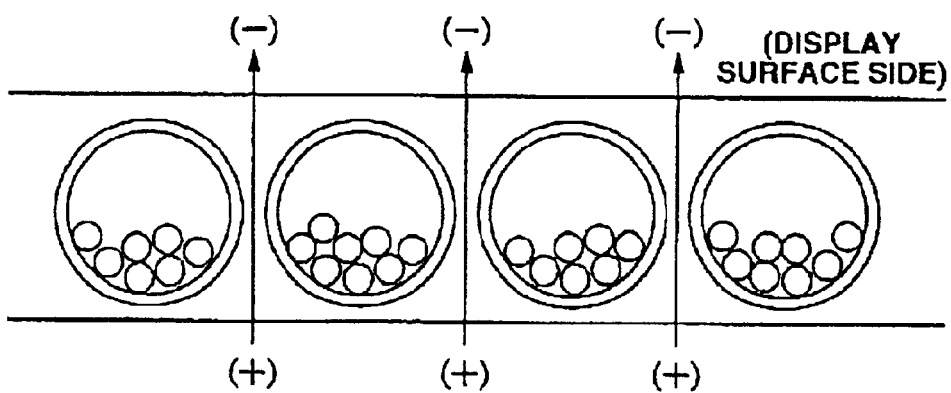
(C)

ELECTRONIC INK

FIG.13
(A)
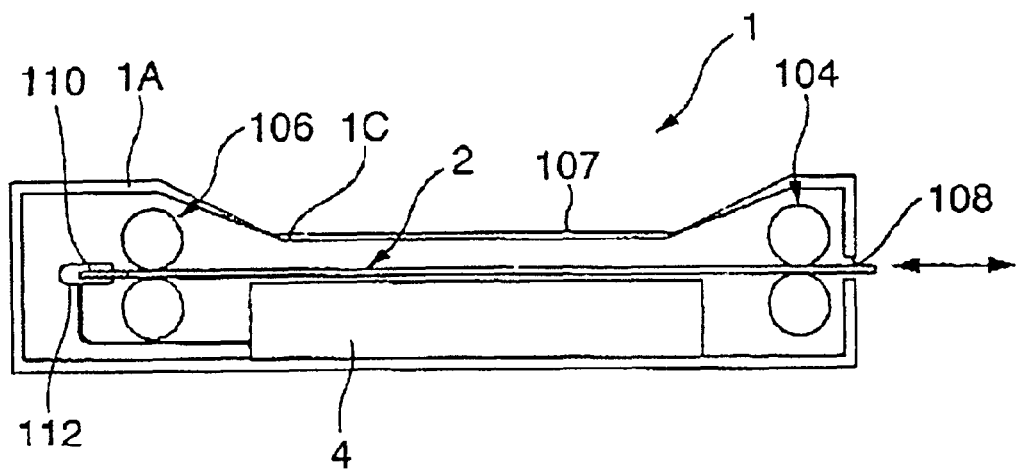
(B)
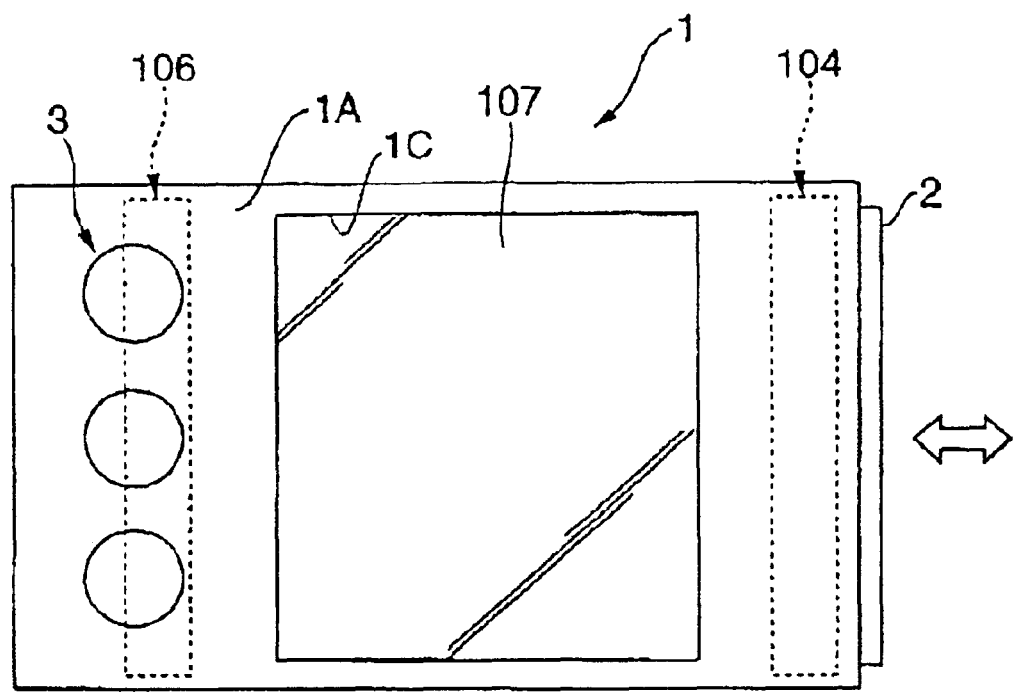

DISPLAY DEVICE AND RECORDING MEDIUM

BACKGROUND OF THE INVENTION

1. Field of the Invention

The present invention generally relates to a display device, and particularly to a display device employing an electrophoretic liquid material referred to as electrophoretic ink which utilizes the electrophoretic phenomenon. This display device is also a storage medium known as electronic paper or an electronic sheet.

2. Description of the Related Art

The phenomenon of charged particles dispersed in a liquid electrophoresing by applying an electric field; in other words, electrophoretic phenomenon, is well known from conventionally. As an application of this phenomenon, known is the fact that by dispersing charged pigment particulates in a dispersed liquid colored with dye, sandwiching these between a pair of electrodes, and applying an electric field thereto, the charged particles are drawn to one of the electrodes, and there have been attempts at applying this to displays. Here, the result of dispersing charged particles in a dispersed liquid colored with dye is referred to as "electrophoretic ink" or "electrophoretic liquid material" and a display employing the above is referred to as an "electrophoretic display (EPD)".

TiO2 (rutile structure), for example, is used as the core of the charged particles, and polyethylene, for example, is used as the cover layer for covering this core. As the solvent, for instance, used is a solvent in which anthraquinone dye is dissolved in ethylene tetrachloride and isoparaffin. The charged particles and solvent have mutually differing colors, and, for example, the charged particles are white, and the solvent is blue, red, green or black. At least one of the electrodes is a transparent electrode.

When an external electric field is applied to the electrophoretic ink (hereinafter simply referred to as "electronic ink") in the electrophoretic display, the charged particles move in the direction opposite to the direction of the electric field when the charged particles are negatively charged. Thereby, the one face for viewing the electronic ink; that is, the surface of the display, appears to be colored in either the color of the solvent or the color of the charged particles. Therefore, by controlling per pixel the movement of the charged particles of the electronic ink positioned in the respective pixel areas, it becomes possible to express display information such as characters, symbols and images on the display surface.

As the relative density of the solvent and charged particles is set to be approximately the same, the charged particles are able to retain the position at the time of electric field application even after the disappearance of the electric field for a relatively long period of time (e.g., from several minutes to about twenty minutes). Thus, low electric consumption can be expected upon being applied to a display.

Moreover, the aforementioned EPD has an extremely wide viewing angle at ±90 degrees, and the contrast is also high. In addition, with a typical EPD, the observers will as a result be viewing the color of the pigment or dye, and, for example, this is different than viewing the light of a fluorescent tube which is a backlight in a transparent liquid crystal display, and realizes a coloration gentle to the eyes. Cost reduction is further possible.

In reality, however, reliability could not be secured due to the agglomeration of the aforementioned pigment particulates, and could not be put into practical use for a long time. Nevertheless, as it became apparent in recent years that reliability could be improve by filling electronic ink in microcapsules, EPDs were catapulted into the spotlight.

As a specific display utilizing this electronic ink, known are the theses "44.3L: A Printed and Rollable Bistable Electronic Display—P. Drzaic et al., SED 98 DIGEST 1131" and "53.3; Microencapsulated Electrophoretic Rewritable Sheet"—H. Kawai et al., SID 99 DIGEST 1102".

The former proposes a flexible display wherein a transparent conductor plate, capsuled electronic ink, patterned silver or graphite conductor layer, and insulation film layer are successively printed in this order on polyester film, and, in order to designate an address of the patterned conduction layer, a hole is provided in the insulation film layer and a lead line is provided therein. The later proposes a rewritable sheet pursuant to electrophoresis employing microcapsuled electronic ink, and a method for writing on this sheet.

Nonetheless, the aforementioned EPDs still have the following unresolved problems. In other words, with electronic ink as described above, the relative density of the solvent and charged particles is set to be approximately the same, and the charged particles are thereby able to retain the position at the time of electric field application even after the disappearance of the electric field for a relatively long period of time. That is, although it possesses a retention property capable of functioning as a memory for retaining data, the time thereof is merely several minutes to several ten minutes. Thereafter, the position of the charged particles moves in the solvent, and the picture quality of the display pattern gradually deteriorates.

Moreover, for instance, with the likes of a liquid crystal display, regardless of the screen changing or not, rewriting is conducted at a speed of sixty times per second. Upon employing this driving method, however, it is not possible to make the best use of the retention property in the aforementioned electronic ink, and low energy consumption cannot be realized thereby.

Further, information represented by the electronic ink is basically two values (two values pursuant to whether the color appearing on the display surface by the charged particles moving is of the charged particles or the solvent), and a fine gradation cannot yet be expressed in a sufficient manner.

Accordingly, an object of the present invention is to retain the function of maintaining information displayed by the electronic ink and preventing the deterioration of the picture quality of the display information in a display device using the electrophoretic phenomenon of a liquid material.

Another object of the present invention is to enable the rewriting of display contents of pixels to be of a required minimum upon renewing the display contents and realizing low energy consumption in this type of display device.

A further object of the present invention is to enable the expression of fine gradation in this type of display device.

SUMMARY OF THE INVENTION

In order to achieve the foregoing objects, the present invention is a display device in which the display state is prescribed by the distribution state of particles, comprising a drive circuit for applying a first voltage for changing the distribution state of the particles, and for applying a second voltage for maintaining the distribution state of the particles.

In the present invention, the maintenance of the distribution state will suffice so as long as it is within the permissible deflection for obtaining a desired display precision; in other words, the distribution position of charged particles does not have to be completely secured so as long as the distribution state of particles can be substantially maintained. For instance, the charged particles are contained in a microcapsule together with liquid for dispersing such charged particles. The charged particles may be of a single type, or a mixture of a plurality of types, and may also be of a composite structure to be contained in a microcapsule.

The present invention is further characterized in that it is provided with a plurality of scanning electrodes and a plurality of data electrodes disposed so as to sandwich the charged particles and for applying voltage to the charged particles. This structure corresponds to the so-called passive voltage application drive system.

The present invention is further characterized in that the aforementioned particles are divided into a plurality of areas, and that it is provided with a plurality of scanning lines and a plurality of data lines for applying voltage independently in such divided areas. This is the so-called active voltage application drive system, and, for example, is structured such that the pixels are disposed in an array, and a switching element, which is an active element, is disposed at the each intersection of the plurality of scanning lines and plurality of data lines. A semiconductor element may be employed as the switching element, and the semiconductor element is principally a thin film transistor. Another example of the switching element is a two-terminal nonlinear element.

In order to achieve the aforementioned objects, the present invention is a display device comprising a data writing circuit which moves charged particles and writes data by filling liquid having charged particles dispersed therein between an active matrix substrate, in which switching elements and pixel electrodes disposed in correspondence with the switching elements are arranged in an array, and an opposed substrate, and applying voltage for each pixel between the active matrix substrate and the opposed substrate; wherein the display device further comprises a refresh circuit for refreshing at prescribed intervals the data of each pixel written pursuant to the data writing circuit.

In order to achieve the foregoing objects, the present invention is a display device comprising a data writing circuit which moves charged particles and writes data by disposing a microcapsule filled with liquid having charged particles disperse therein between an active matrix substrate, in which switching elements and pixel electrodes disposed in correspondence with the switching elements are arranged in an array, and an opposed substrate, and applying voltage for each pixel between the active matrix substrate and the opposed substrate; wherein the display device further comprises a refresh circuit for refreshing at prescribed intervals the data of each pixel written pursuant to the data writing circuit.

In order to achieve the aforementioned objects, the present invention is a display device comprising a data writing circuit which moves charged particles and writes data by filling liquid having charged particles dispersed therein between an active matrix substrate, in which switching elements and pixel electrodes disposed in correspondence with the switching elements are arranged in an array, and an opposed substrate, and applying voltage for each pixel between the active matrix substrate and the opposed substrate; wherein the data writing circuit comprises a switch for turning the data writing on/off and structured of the switching elements and a driver for controlling the switching elements, and the driver is structured so as to be driven with a decoder method.

Here, the driver for controlling the switching element shall mean a data driver to be connected to the data line and a scan driver to be connected to the scan line of the pixel unit in many cases. The writing of data will realize low energy consumption by selecting and rewriting only the pixels for rewriting data.

In order to achieve the foregoing objects, the present invention is a display device comprising a data writing circuit which moves charged particles and writes data by disposing a microcapsule filled with liquid having charged particles dispersed therein between an active matrix substrate, in which switching elements and pixel electrodes disposed in correspondence with the switching elements are arranged in an array, and an opposed substrate, and applying voltage for each pixel between the active matrix substrate and the opposed substrate; wherein the data writing circuit comprises a switch for turning the data writing on/off and structured of the switching elements and a driver for controlling the switching elements, and the driver is structured so as to be driven with a decoder method.

Here, the driver for controlling the switching element shall mean a data driver to be connected to the data line and a scan driver to be connected to the scan line of the pixel unit in many cases. The writing of data will realize low energy consumption by selecting and rewriting only the pixels for rewriting data.

In order to achieve the aforementioned objects, the present invention is a display device comprising a data writing circuit which moves charged particles and writes data by filling liquid having charged particles dispersed therein between an active matrix substrate, in which switching elements and pixel electrodes disposed in correspondence with the switching elements are arranged in an array, and an opposed substrate, and applying voltage for each pixel between the active matrix substrate and the opposed substrate; wherein a single pixel is structured of a plurality of sub pixels, and gradation is controlled by pulse-surface-area modulation.

In order to achieve the foregoing objects, the present invention is a display device comprising a data writing circuit which moves charged particles and writes data by disposing a microcapsule filled with liquid having charged particles dispersed therein between an active matrix substrate, in which switching elements and pixel electrodes disposed in correspondence with the switching elements are arranged in an array, and an opposed substrate, and applying voltage for each pixel between the active matrix substrate and the opposed substrate; wherein a single pixel is structured of a plurality of sub pixels, and gradation is controlled by pulse-surface-area modulation.

In order to achieve the aforementioned objects, the present invention is a display device comprising a data writing circuit which moves charged particles and writes data by filling liquid having charged particles dispersed therein between an active matrix substrate, in which switching elements and pixel electrodes disposed in correspondence with the switching elements are arranged in an array, and an opposed substrate, and applying voltage for each pixel between the active matrix substrate and the opposed substrate; wherein the charged particles are formed of a plurality of types of charged particles with differing quantities of electric charge.

In the present invention, the gradient is controlled by controlling one or both of the value/time of the voltage to be applied with the data writing circuit.

In order to achieve the foregoing objects, the present invention is a display device comprising a data writing circuit which moves charged particles and writes data by disposing a microcapsule filled with liquid having charged particles dispersed therein between an active matrix substrate, in which switching elements and pixel electrodes disposed in correspondence with the switching elements are arranged in an array, and an opposed substrate, and applying voltage for each pixel between the active matrix substrate and the opposed substrate; wherein the charged particles are formed of a plurality of types of charged particles with differing quantities of electric charge.

In the present invention, the gradient is controlled by controlling one or both of the value/time of the voltage to be applied with the data writing circuit.

In the present invention, it is preferable that the switching element is a low-temperature poly-Si TFT as the switching element has high mobility, and as it is possible to integrate a driver. Moreover, from the perspective of cost reduction, it is preferable that the switching element is a TFT of a structure wherein the channel portion is at least formed of an organic film.

In the present invention, the refresh circuit does not necessarily once clear (delete) the data of images and characters generating the distribution of the charged particles. In other words, with the display device of the present invention, voltage is applied upon initially displaying the image, and, thereafter, the relative density of the particles and liquid is approximately the same, and the distribution state of charged particles can be maintained even when the application of voltage is released. In this type of display device, with the purpose of stabilizing or maintaining the initial distribution state of charged particles upon having applied voltage to charged particles, voltage merely needs to be applied periodically or occasionally based on the image data. That is, different from the "refresh" implying the deletion and writing of data conducted conventionally with liquid crystal displays, it is not necessarily imperative to delete the data in the present invention. As the display device of the present invention also functions as electronic paper; in other words, since it comprises a function of displaying image and character information as is in correspondence to the distribution of charged particles for a prescribed period of time after applying voltage to the charged particles in accordance with image data, the present invention also corresponds to a recording medium. With the display device structured of at least a display unit, which is the recording medium, and peripheral circuits containing the voltage application circuit, for example, even upon removing the display unit from the peripheral circuits, it would still be possible for users to confirm the information displayed on this electronic paper at home, in the office, and so on. Further, for instance, upon employing the present invention in a car navigation system, it would be possible for a user to remove the portion (electronic paper) displaying the map upon having arrived at a parking space nearby one's destination from the peripheral circuit, and bring it along while he/she walks to the destination.

BRIEF DESCRIPTION OF THE DRAWINGS

FIG. 4 is a diagram explaining the schematic structure of the electronic ink layer and the operation thereof upon application of voltage;

FIG. 13 is a side view of the display device having a detachable display body (electronic paper/recording medium).

DESCRIPTION OF THE PREFERRED EMBODIMENTS

Figure 1:
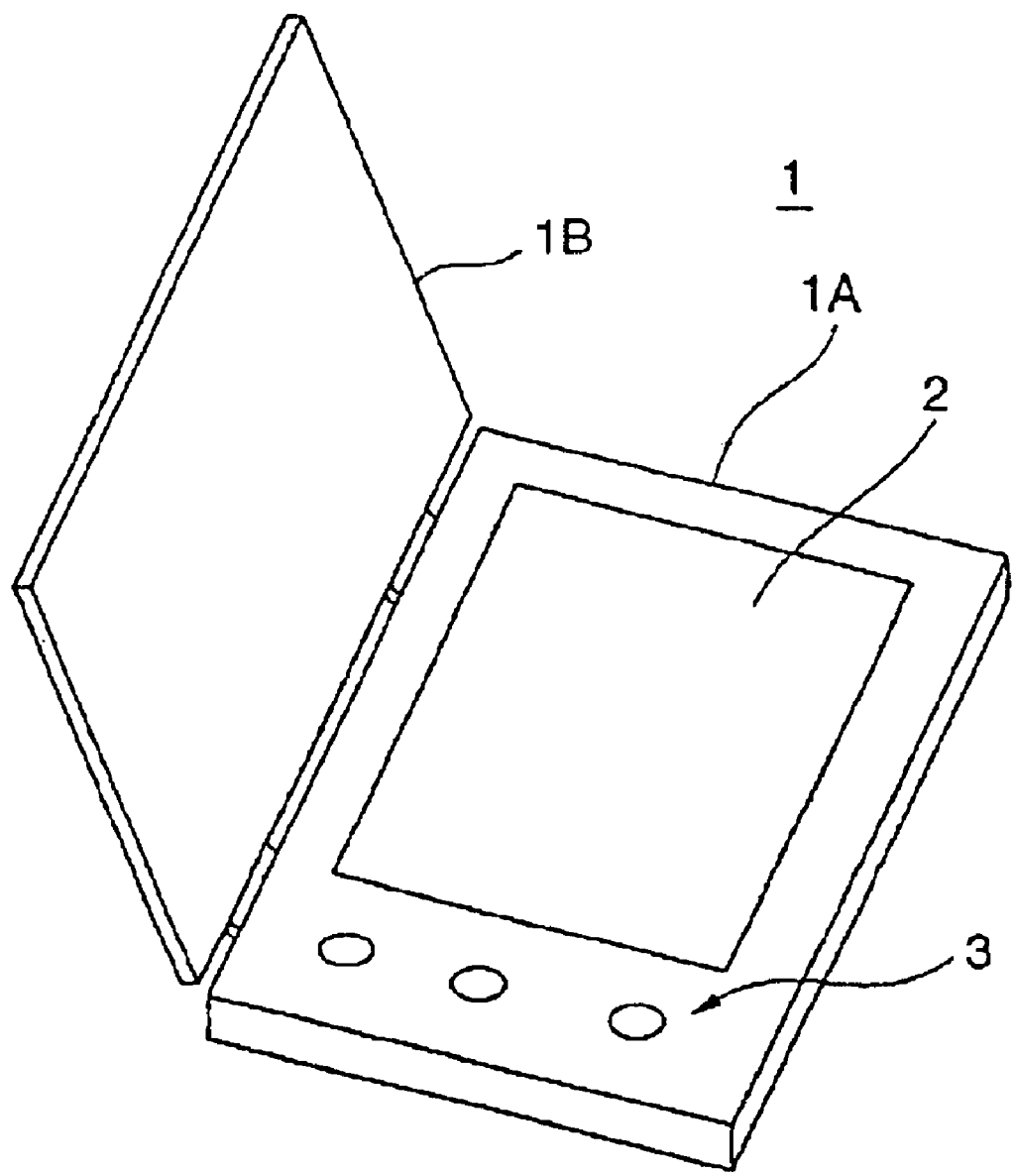
FIG. 1 is a diagram showing the appearance of an electronic book as the display device employing the present invention.

Embodiments of the present invention are now explained with reference to the attached drawings. The display device 1 according to the present embodiment has, for example, a shape of an electronic book (sometimes referred to as "electronic paper") as shown in FIG. 1. This display device 1 comprises a book-shaped frame 1A, and a cover B1 for opening and closing this frame 1A. A display body 2 is provided on the surface of the frame 1A in a state where the display surface thereof is exposed, and an operational unit 3 is also provided thereto. Frame 1A has a built-in controller 4, a counter 5 and a memory 6 (refer to FIG. 2).

The display body 2 of the present embodiment comprises a pixel unit 2A formed by filling electronic ink in a switching element, and a peripheral circuit 2B provided integrally with this pixel unit 2A. As described later, the peripheral circuit 2B comprises a decoder-type scan driver and data driver.

Figure 3:
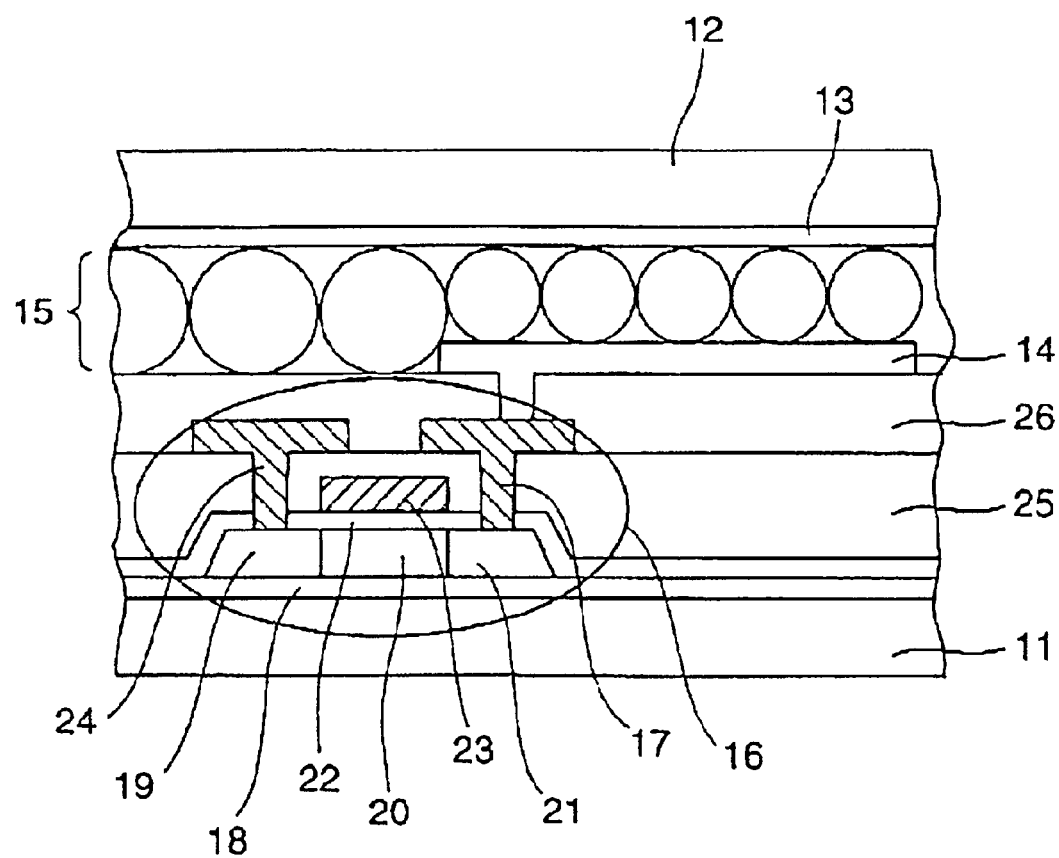
FIG. 3 is a partial cross section of a switching element forming the pixel unit of the display body of the display device.

FIG. 3 shows a cross section structure of the pixel unit 2A. As shown in FIG. 3, an opposed substrate 12 is adhered on the substrate 11, and a common electrode 13 is formed on this opposed substrate 12. An electronic ink layer 15 is laminated between this common electrode 13 and a pixel element 14. This pixel element 14 is serially connected to a drain electrode 17 of a TFT 16, and this TFT acts as a switch. Here, either the common electrode 13 or the pixel electrode 14 is of a transparent electrode, and the transparent electrode side will become the display surface.

The TFT comprises a source layer 19, a channel 20 and a drain layer 21 formed on the base insulation film 18; a gate insulation film 22 formed thereon; a gate electrode 23 formed on this gate insulation film 22; a source electrode 24 formed on the source layer 19; and a drain electrode 17 formed on the drain layer 21. The TFT is further sequentially covered with an insulation film 25 and an insulation film 26.

As shown in FIG. 4, the electronic ink layer 15 is structured of a transparent binder 41 having optical permeability, and a plurality of microcapsules 42 dispersed uniformly and fixedly in this binder 41. The thickness of the electronic ink layer 15 is approximately 1.5 to 2 times the diameter of the microcapsule 42. Silicon resin or the like is used as the material of the binder 41. The microcapsule 42 comprises a hollow and spherical capsule body 43 having optical permeability. Liquid (solvent) 44 is filled in this capsule body 43, and a plurality of electronegative charged particles 45 are dispersed in the liquid 44. Each of the charged particles 45 is structured of a core 45A, and a cover layer 45B for covering such core. The color of the charged particle 45 and liquid 44 is set to be mutually different. As an example, the charged particle may be white, while the liquid may be blue, red, green or black. The relative density of the liquid 44 and the charged particles 45 is set to be of a mutually and substantially equivalent value in the respective microcapsules 42.

When an electric field is applied externally to the microcapsules in the aforementioned state, the charged particles 45 move in a direction opposite to the direction of the electric field in the microcapsules 42. As a result, presuming that the current display surface is on the upper side face (i.e., surface of the opposed substrate side) of FIG. 3, when the charged particles 45 move toward the upper side in FIG. 3, viewed will be the color (white for example) of the charged particles 45 standing out with the color (blue, red, green or black for example) of the liquid 44 being the background (refer to FIG. 4(B)). Contrarily, when the charged particles 45 move toward the lower side in FIG. 3 pursuant to the application of the electric field, only the color (blue, red, green or black for example) of the liquid 44 can be viewed (refer to FIG. 4(C)).

The charged particles 45 that moved toward the direction opposite to the direction of the electric field pursuant to the application of such electric field have a relative density approximately the same as with the liquid 44, and, therefore, try to stay at such position for a long period of time even after the electric field is eliminated. In other words, they have a retention property (a property capable of being used as a memory, hereinafter referred to "memory property"), and the color of the charged particles 45 or liquid 44 appearing on the display surface is retained for an interim (several minutes to several ten minutes). Here, by controlling the application of the electric field for each pixel, information according to such application pattern will be displayed on the display surface (refer to FIG. 1) of the display body 2, and such information will be retained for a relatively long period of time.

Nevertheless, pursuant to the lapse in time, the charged particles 45 naturally diffuse as a result of gravity and vibration, the picture quality of the display surface presenting the information will gradually deteriorate, and information can no longer be accurately displayed. Thus, in the present embodiment, as described later, the refresh operation is periodically implemented in order to maintain the presentation of the information.

Figure 5:
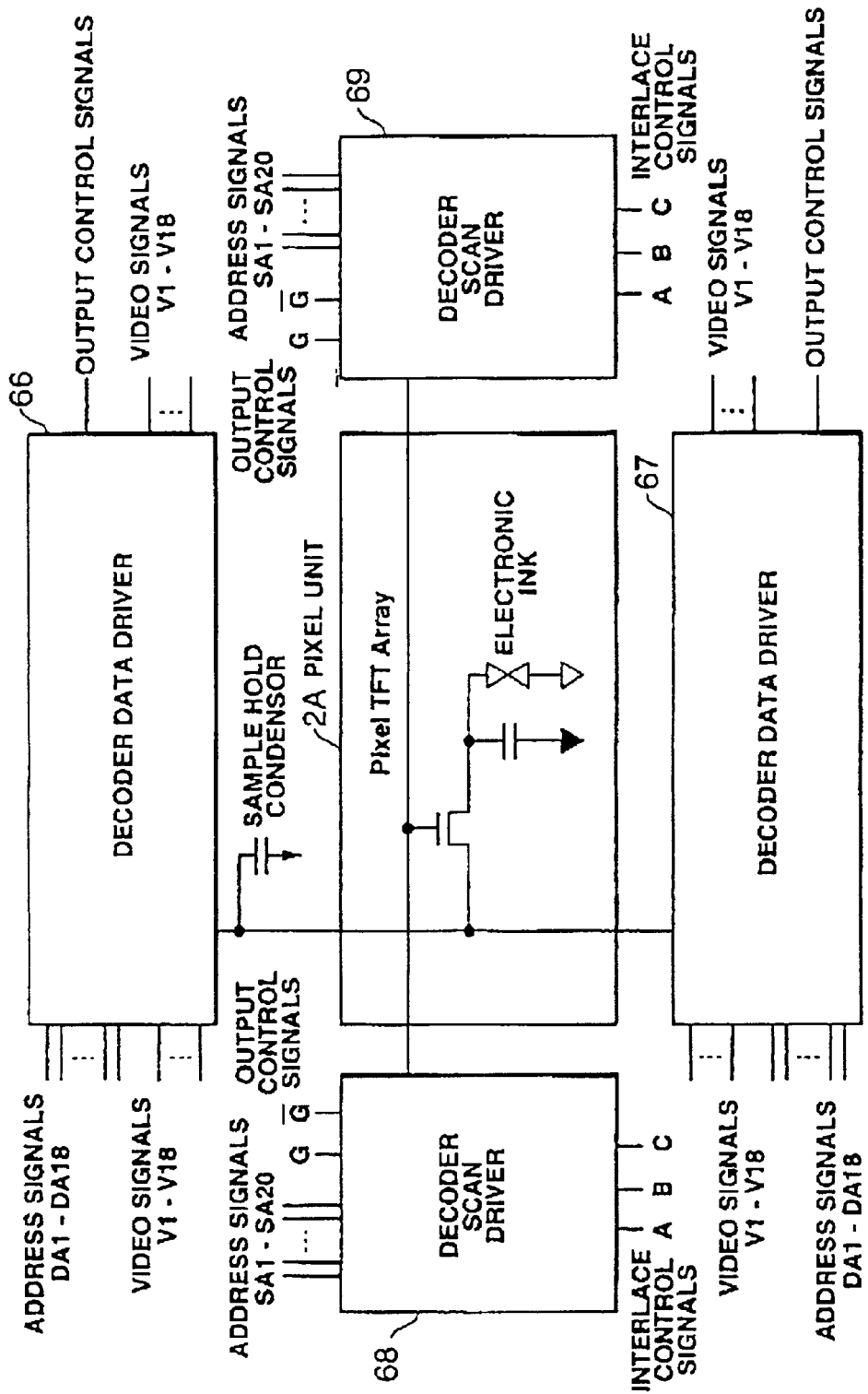
FIG. 5 is a block diagram showing the schematic structure of the display body of the display device.
Figure 6:
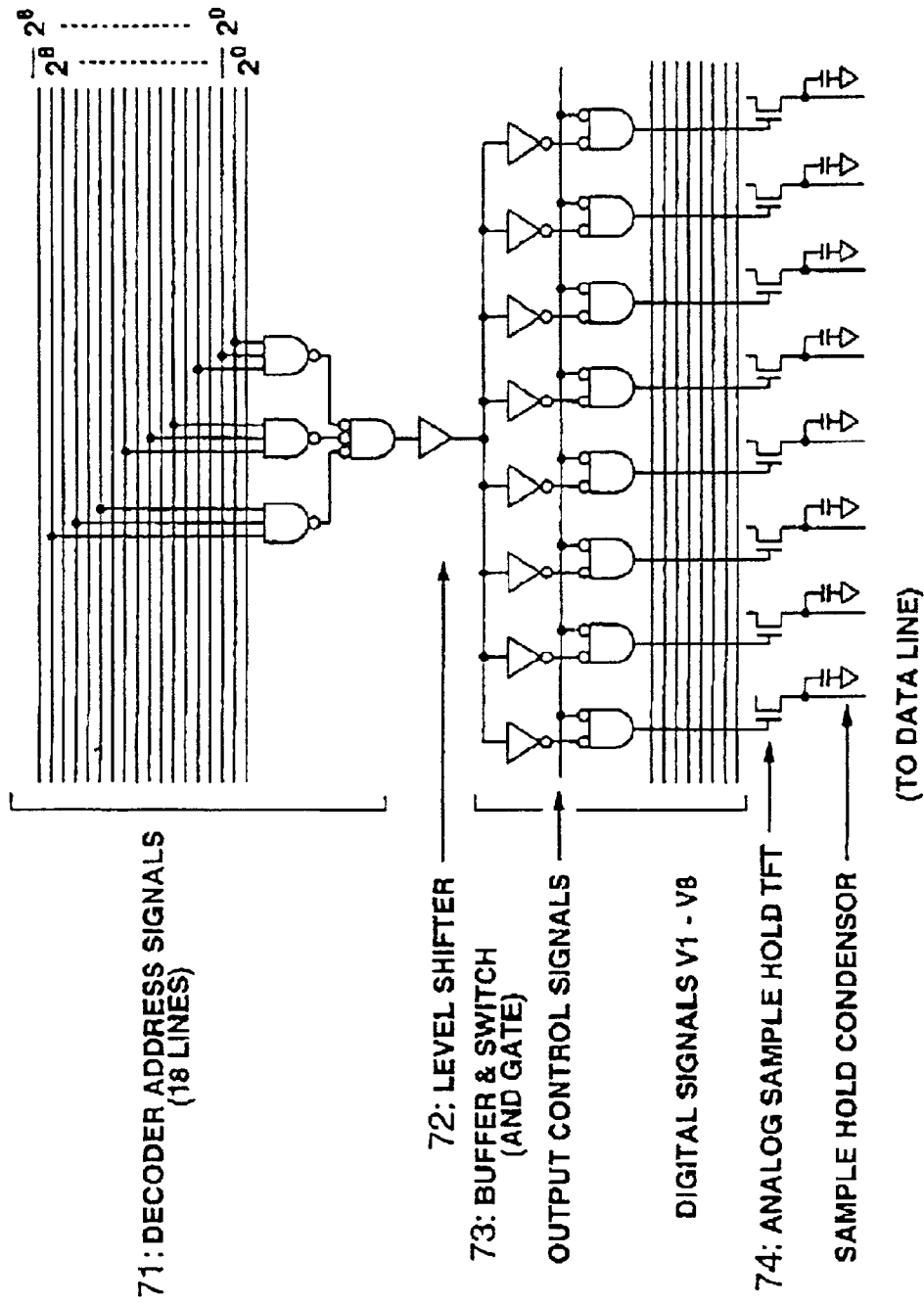
FIG. 6 is a block diagram showing the schematic structure of a decoder data driver as the peripheral circuit of the pixel unit.

Moreover, information pursuant to the movement of charged particles 45 by the electric field will only be binary information to be presented at this rate. In other words, information to be decided by whether the color appearing on the display screen is pursuant to the charged particles 45 (white for example), or pursuant to the liquid 44 (black for example). The present embodiment therefore proposes the realization of gradation (gray scale) with a method referred to as pulse-surface-area modulation The peripheral circuit 2B uniformly and integrally formed with the pixel unit 2A and forming the display body 2 is now explained with reference to FIGS. 5 to 7. As shown in FIG. 5, this peripheral circuit 23 is formed of data drivers 66, 67 connected to both ends of the respective data lines of the pixel unit 2A, and scan drivers 68, 69 connected to both ends of the respective data lines of the pixel unit 2A. As shown in FIG. 6, the data drivers 66, 67 respectively comprise a 9-bit decoder 11, a level shifter 72, a buffer and AND gate switch unit 73, and an analog sample hold TFT 74. The decoder 71 is formed of three NAND gates, one NOR gate, and eighteen address signal lines. The output terminal of this decoder 71 is connected to eight buffers, and simultaneously transmits address signals to eight data lines. Thus, the eight analog sample hold TFTs are simultaneously switched, and eight data are simultaneously transferred to the hold condenser. This structure is suitable for decreasing the speed of the data drivers 66, 67.

Figure 7:
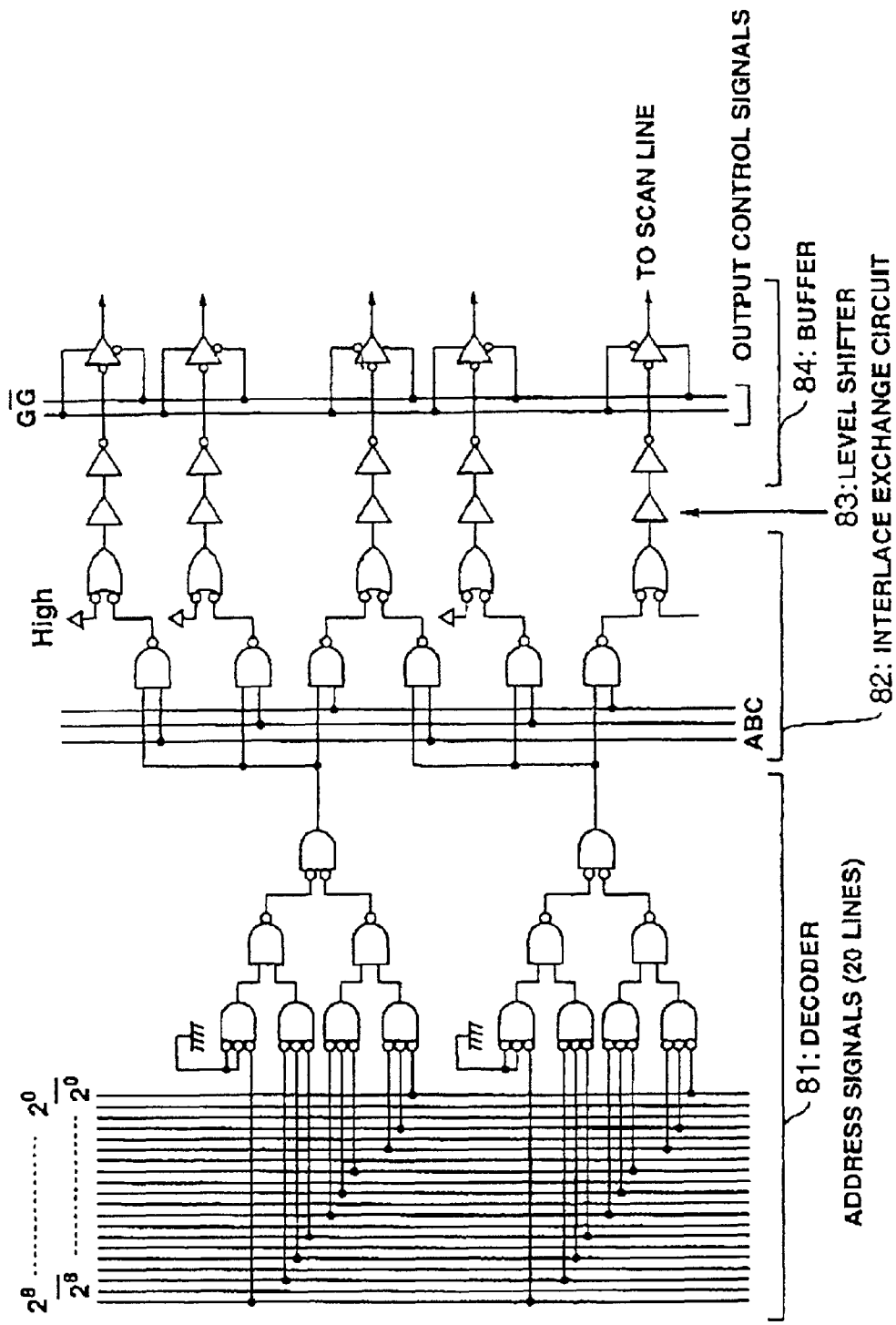
FIG. 7 is a block diagram showing the schematic structure of a decoder scan driver as the peripheral circuit of the pixel unit.

Meanwhile, as shown in FIG. 7, the scan drivers 68, 69 respectively comprise a 10-bit decoder 81, an interlace exchange circuit 82, a level shifter 83 and an output buffer 84. This structure is illustrated with a mode for simultaneously scanning two lines, and with a non-interlace scan mode. In order to scan with these scan modes, a structure is adopted wherein the interlace exchange circuit 82 applies control signals A, B, C. By simultaneously scanning two lines as described above, it is possible to increase the resolution in the vertical direction without having to increase the scan rate. A pair of scan lines is simultaneously selected, and this combination is exchanged between the two conditions.

As described above, since the decoder method is employed for the data drivers 66, 67 and the scan drivers 68, 69, in the pixel unit 2A, it will suffice to only rewrite the pixels to be renewed for the display data of the electronic ink layer. The reduction of energy consumption will also be realized thereby.

(Data Renewal and Refresh Operation)

Here, let it be assumed that when a pulse, which is a negative electrode against the common electrode 13 and of a prescribed voltage value, is applied to the pixel electrode 14, the white color of the charged particles 45 in the microcapsules 42 appears on the display surface, and, meanwhile, when a pulse, which is a positive electrode against the common electrode 13 and of a prescribed voltage value, is applied to the pixel electrode 14, the black color of the liquid 45 appears on the display surface.

Figure 2:
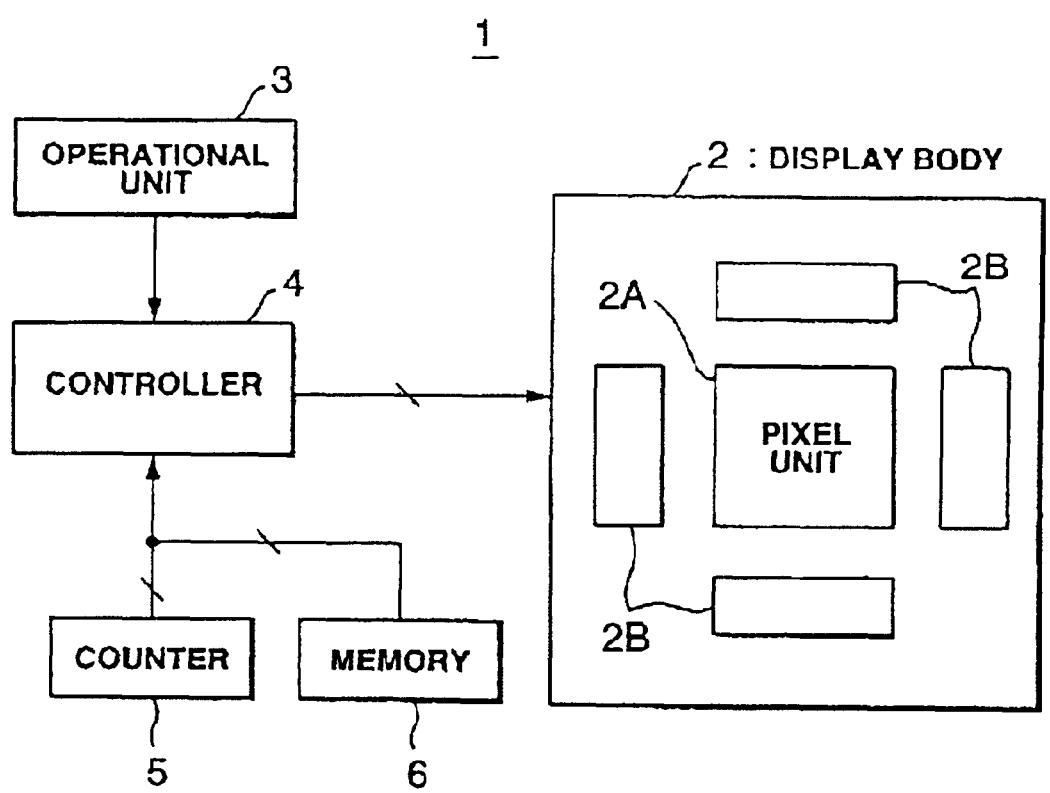
FIG. 2 is a diagram showing the electric block structure of the display device.
Figure 8:
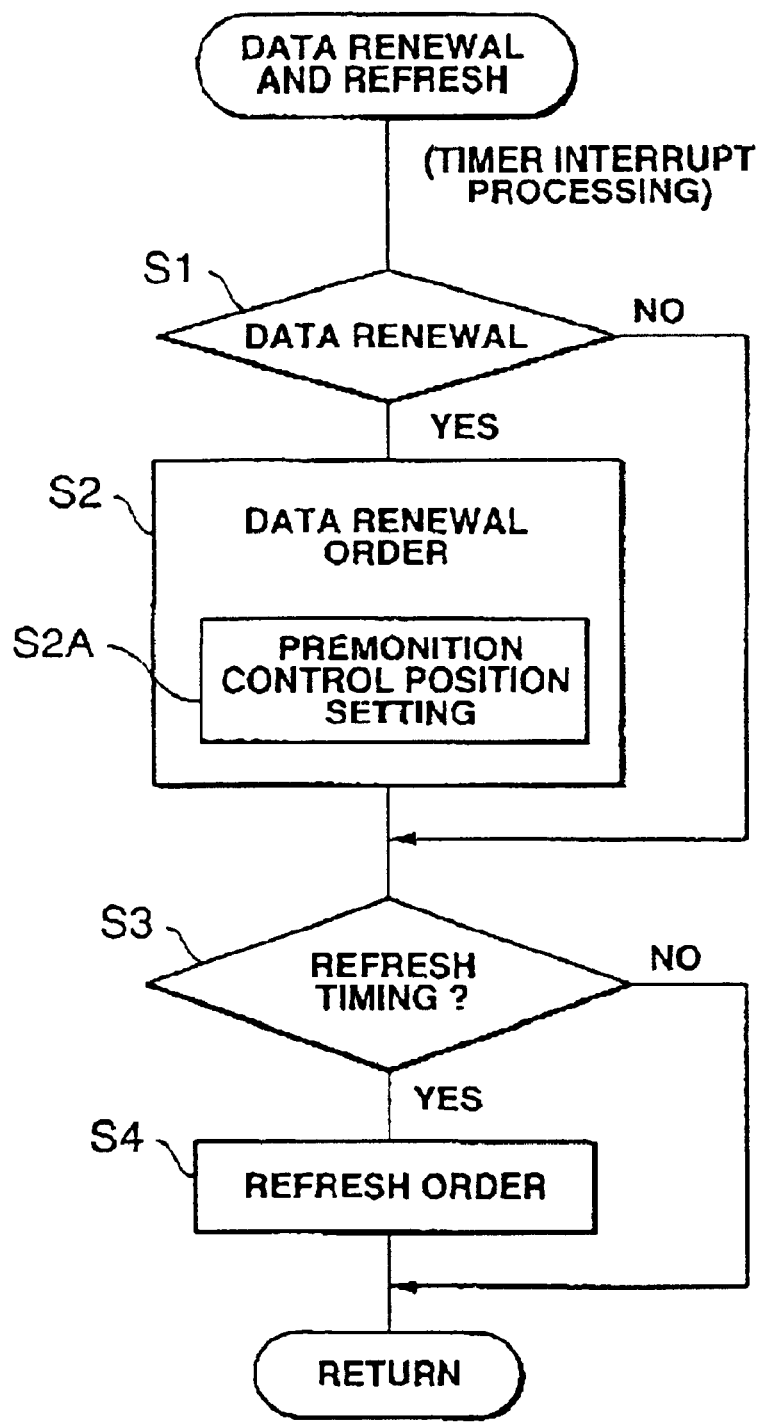
FIG. 8 is a schematic flowchart explaining the renew and refresh operations of the display data with a controller.

The controller 4 depicted in FIG. 2 conducts the interrupt processing shown in FIG. 8 for each fixed frame rate. Upon entering this interrupt processing, it is foremost judged as to whether the display data of the electronic ink layer 15 should be renewed or not (step S1). This judgment, for example, corresponds to when the reader conducts an operation so as to turn the page of the electronic book via the operational unit 3. When this judgment is YES, the controller 4 conducts the processing of step S2, but when this judgment is NO, it skips the processing of step S2.

At step S2, the controller 4 reads the contents of the data to be renewed from the memory 6, and orders the electronic ink layer 15 to conduct writing for each pixel pursuant to the above.

In such a case, the controller 4 selects and applies voltage (first voltage), via the decoder drivers 66–69, only to the pixel element 14 of the pixel coinciding with the renewal contents. Contents of the newly renewed data may thereby be displayed.

Figure 9:
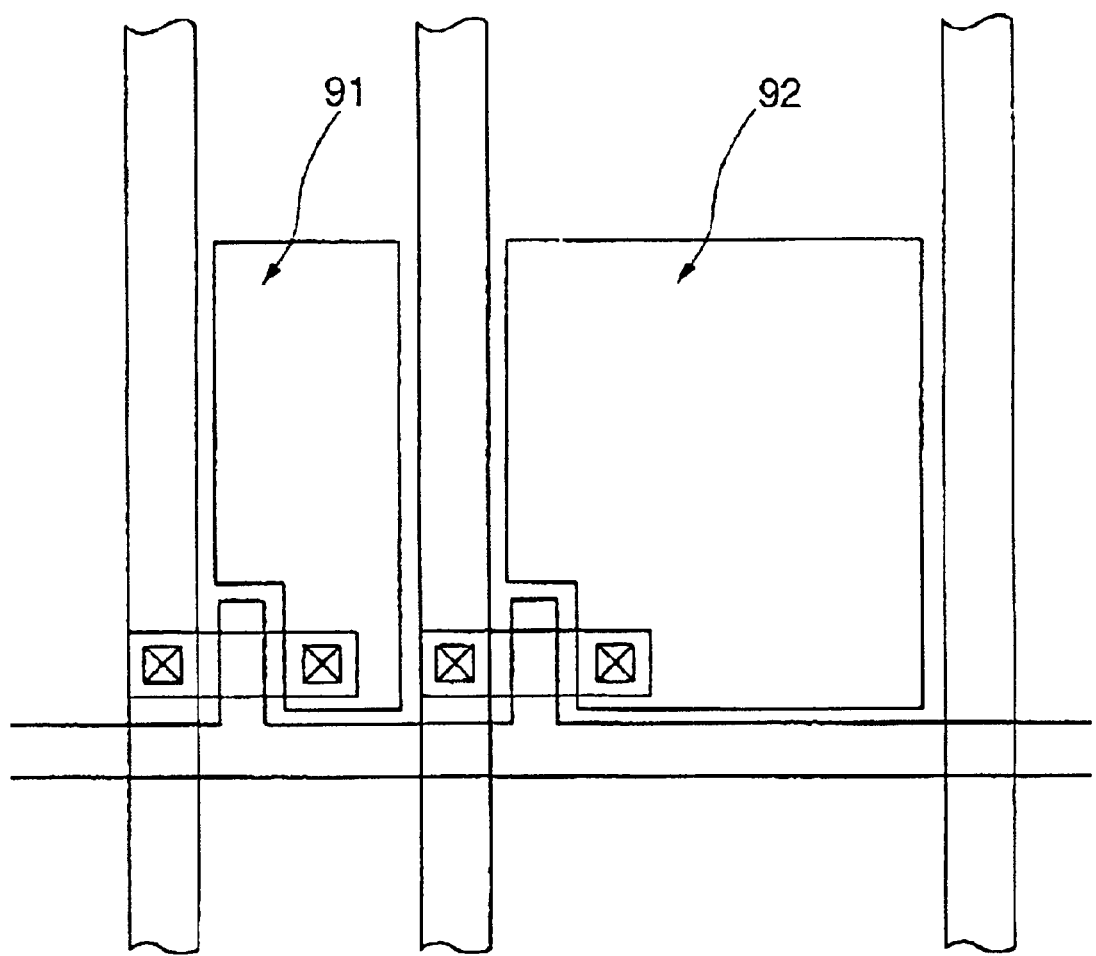
FIG. 9 is a layout diagram of the pixel unit upon realizing four gradations with pulse-surface-area modulation.

In this data renewal processing, the controller 4 may set the gradation (step S2A) based on the well-known pulse-surface-area modulation (for example, the thesis "TFT- LEPD with Image Uniformity by Area Ratio Gray Scale-M. Kimura et al." In other words, this is structured of a plurality of sub pixels that adopt either the on state or off state of the respective pixels, and, depending on the number of sub pixels in the on state (off state), the gray scale (gradation) between white and black; for example, light gray or dark gray, is adjusted. For instance, FIG. 9 is a layout diagram of the pixel unit in a case of realizing four gradations with the pulse-surface-area modulation. Each pixel is structured of two sub pixels (91, 92), wherein the area of one is double the other. Here, the four gradations can be realized (a) when two of the sub pixels (91, 92) are both off, (b) when only the sub pixel (91) with the smaller area is on, (c) when only the sub pixel (92) with the larger area is on, and (d) when the two of the sub pixels (91, 92) are both or. Thereby, the contents to be displayed on the display surface is not limited to character information, and pictures and images may also be favorably expressed.

Next, the controller 4 judges whether it is of a refresh timing or not via timing with the count value of the counter (Step S3). As described above, this refresh is a rewriting operation for maintaining data retention when the setting time capable of retaining the memory property of the electronic ink layer 15 elapses. The setting time of this refresh is a suitable time within the range of several minutes to several ten minutes. When the judgment at this step S3 is NO; that is, when the refresh timing has not yet been reached, the processing at the next step S4 is skipped. Contrarily, when the judgment at step S3 is YES, the refresh operation is ordered (step S4).

With respect to the pixels displaying white for example, this refresh operation selectively reapplies a voltage pulse (second voltage) with a negative voltage property to the common electrode, and moves the charged particles 45 in the microcapsules 42 toward the display surface side; that is, toward the common electrode side in the example of FIG. 3, or retains such state if the charged particles have already moved toward the display surface side. Then, regarding the pixels displaying black, the refresh operator selectively applies a voltage pulse with a positive electrode property to the common electrode, and moves the charged particles 45 in the microcapsules 42 toward the side opposite to the display surface side; that is, toward the side opposite to the common electrode side in the example of FIG. 3, or retains such state if the charged particles have already moved toward the side opposite to the display surface side. Thereby, prior to the refresh operation, the pixels represented in white pursuant to the charged particles 45 will continue to be represented in white, and the pixels represented in black pursuant to the liquid 44 will continue to be represented in black. Here, regarding the pixels represented in a gray scale pursuant to the pulse-surface-area modulation, as the sub pixels thereof will similarly be refreshed, the gray scale representation will also be maintained. Moreover, with respect to the aforementioned example, the timing of the refresh operation for the white color display and black color display may differ.

The aforementioned processing will be repeatedly executed in prescribed intervals. According to the display of the present embodiment, unlike the display body employing conventional electronic ink, the refresh operation will be conducted in an appropriate timing, as well as automatically and periodically, before the lapse of the time of several minutes to several ten minutes when the memory property will be lost. Thus, the memory property will be retained, and the picture quality of the display pattern will also be retained as per the initial display. In other words, this refresh operation will prevent troubles such as the display information becoming difficult to see or eliminated altogether, and will become preferable as a display device such as an electronic book.

Furthermore, the information to be displayed with this display device is not only binary information as conventionally, and gradients between the binary information is represented by the pulse-surface-area modulation. Thus, it is possible to provide a display medium preferable for display information requiring fine tone.

In addition, as the peripheral driver is uniformly and integrally manufactured with the switching element, the structure will be of an overall compact size.

Moreover, as the driver employs a decoder method capable of designating pixels to be rewritten by the combination of inputs, it is sufficient to conduct data rewriting by selectively designating the required pixels, and it is not necessary to rewrite all of the pixels of the pixel unit. It is therefore possible to significantly reduce the energy consumption required for rewriting the data of the electronic ink layer of the pixel unit.

Further, the employment of this electronic ink will enable the structure of a reflective display device with high contrast ratio, and, as a backlight will no longer be necessary, it is further possible to reduce energy consumption.

The present invention is not limited to the aforementioned embodiment, and may be modified in various modes.

Figure 10:
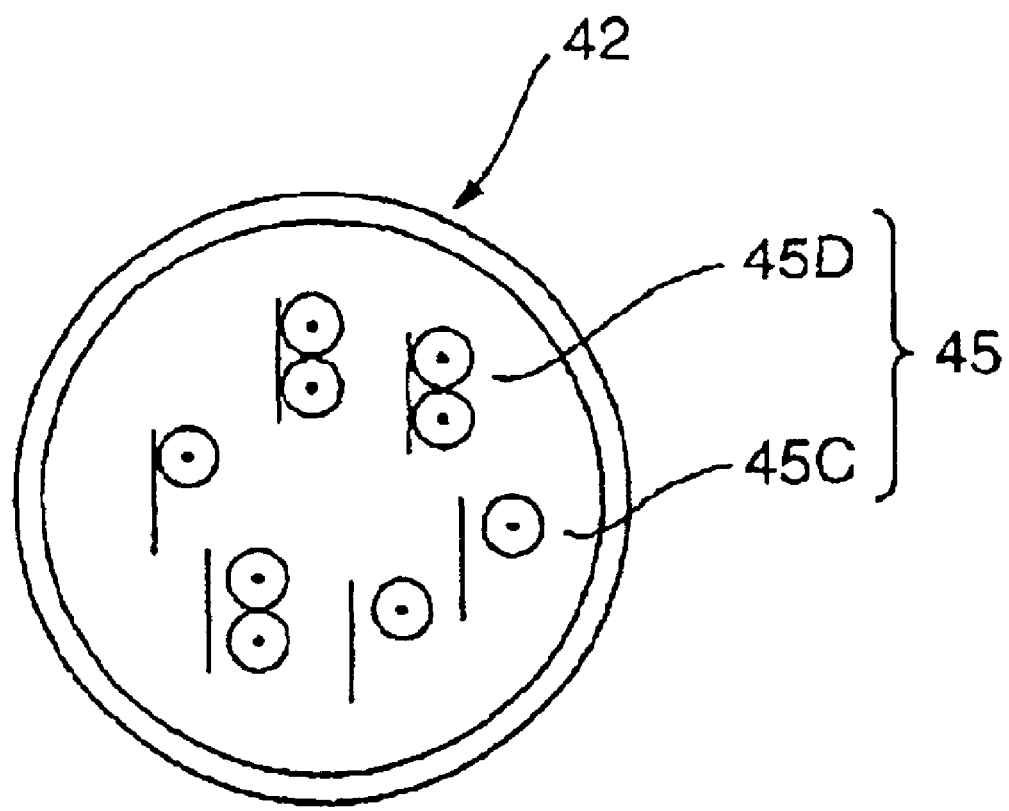
FIG. 10 is a conceptual diagram of a microcapsule containing charged particles having different electric charge and pertaining to a modified example of the electronic ink layer.

As one mode thereof, wherein the conceptual structure is shown in FIG. 10, a plurality of types of charged particles 45C, 45D with different electric charges (e.g., the electric charge of one charged particle 45D is twice that of the other charged particle 45C) are employed as the charged particles 45 to be scattered in the liquid 44 within the respective microcapsules 42. Then, the time and/or value of the DC voltage to be applied to the common electrode and the respective pixel electrodes upon data rewriting is suitably changed. The change in the electric charge is reflected in the behavior of the speed or the like when the charged particles 45 move, and it is thereby possible to express an even finer gradient.

Figure 11:
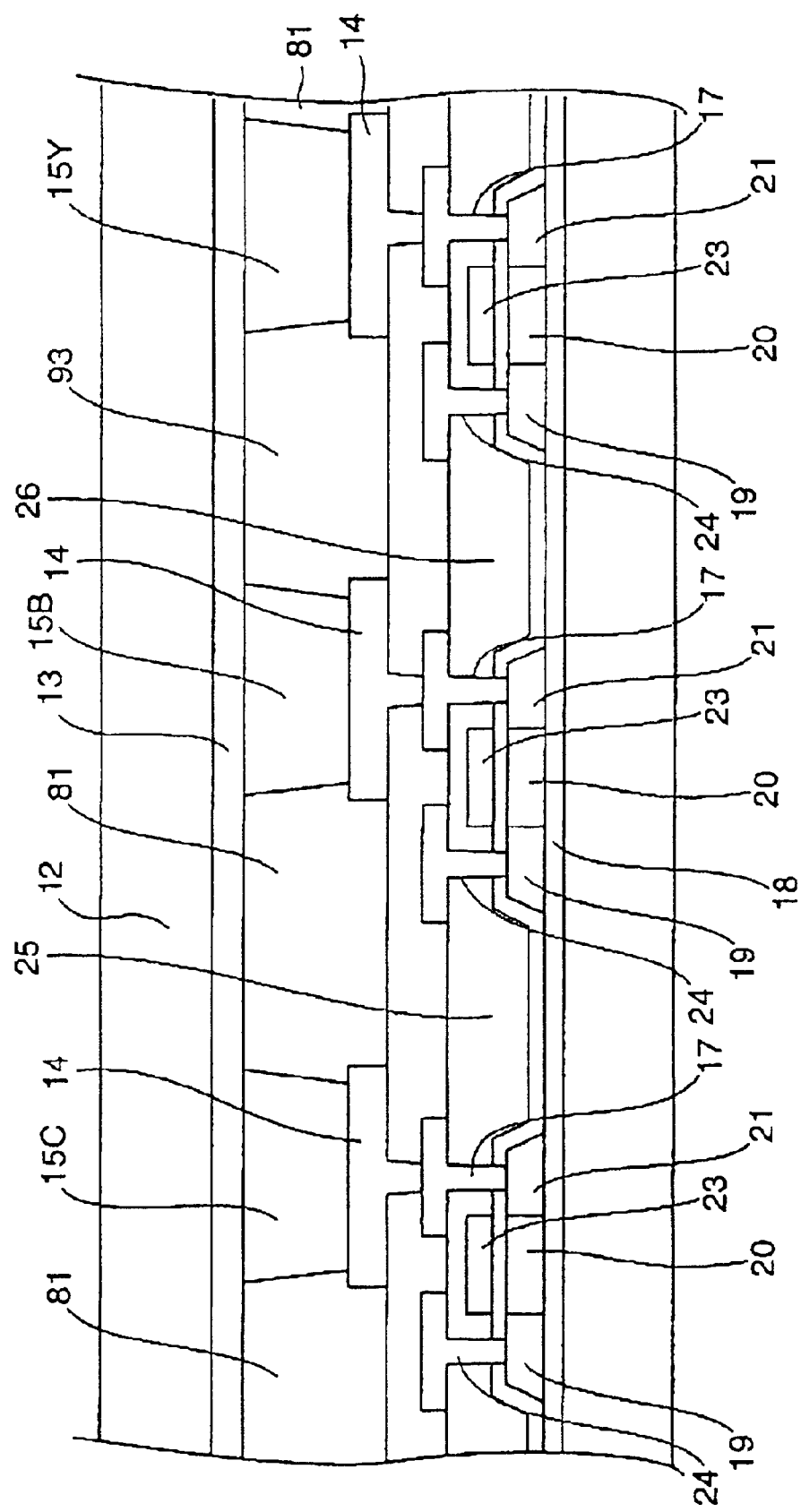
FIG. 11 is a partial cross section showing a color thin-film structure pertaining to a modified example of the switching element.

As a substitute to the monochrome representation of the aforementioned display information, another embodiment enables a color representation. This can be realized by employing a switching element depicted in FIG. 11, for example, in place of the aforementioned switching element illustrated in FIG. 3. Specifically, by adopting a structure wherein the common electrode 13 and pixel electrode 14 are partitioned with a bank 93, and the electronic ink layer 15, with an electronic ink layer 15C for cyan, electronic bank layer 15M for magenta, and electronic bank layer 15Y for yellow as one et, is arranged on the pixel unit in a suitable pattern, the voltage application state of the electronic ink layer of the respective colors may be controlled in accordance with the display color pattern.

Further, with the aforementioned embodiment, although a TFT element was employed as the switching element being the mainstream of the so-called active matrix drive, an MIM (Metal Insulator Metal) element may also be used. This MIM is characterized in that it has a laminated structure of metal—insulation film—metal, and yields a bi-direction diode characteristic having a steep threshold value.

Moreover, without limitation to the foregoing active matrix drive, a so-called simple matrix drive (passive matrix drive) may be used to control the image display.

Figure 12:
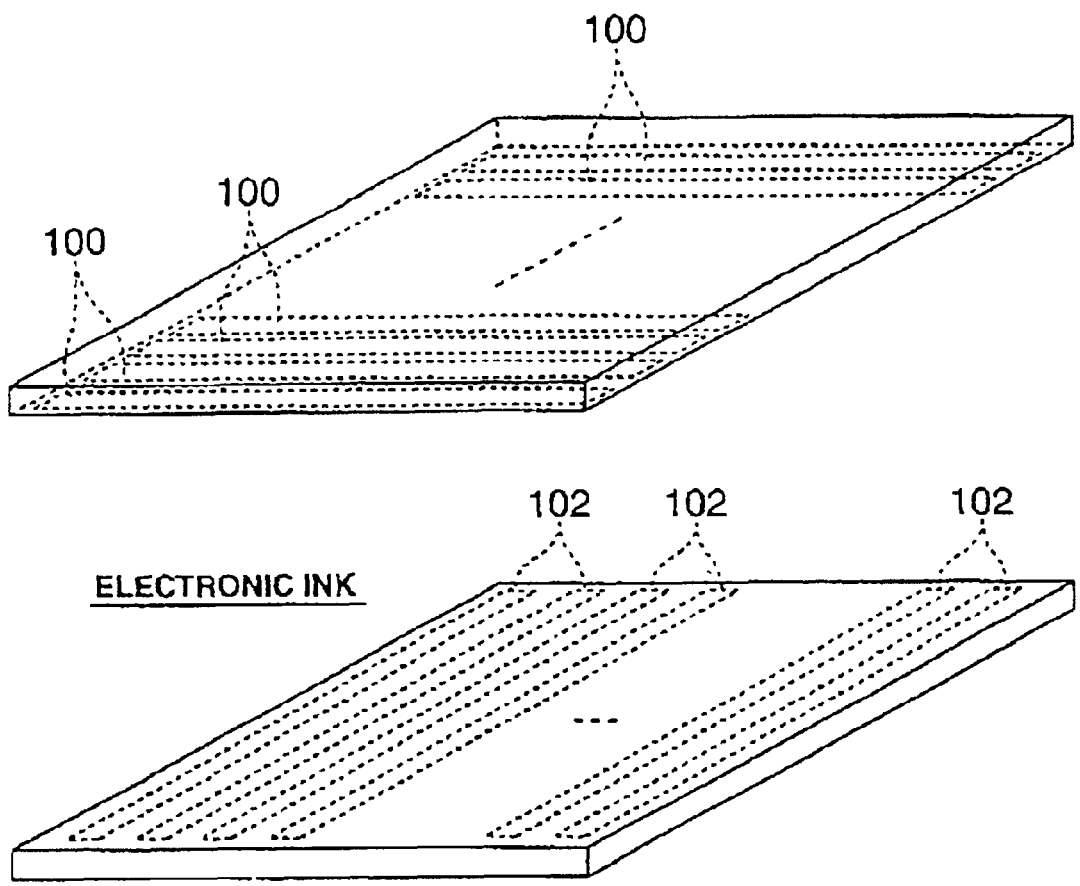
FIG. 12 is a schematic diagram of a passive driving method in the display device of the present invention.

FIG. 12 illustrates the basic structure of the passive matrix drive system. This passive matrix drive system sequentially selects in a pulse-like manner the scanning electrode 100 provided on one surface of the electronic ink layer 15, and then selects and applies voltage to the signal electrode (data electrode) 102 (other surface of the electronic ink layer 15) corresponding to the respective microcapsules upon selecting such scanning electrode 100. Presuming that the total number of scanning electrodes 100 is N, it is only possible to apply voltage to a single scanning electrode 100 for 1/N the time of the screen display period. This will result in a limited resolution, but will be sufficient upon being employed in the display device 1 of the present embodiment. In other words, the drive systems of a generally known liquid crystal display device are applicable, and in comparison to the liquid crystal continuously driving the voltage, with the display device of the present embodiment, once voltage is applied, yielded is an advantage unavailable to liquid crystal display devices wherein the image is maintained even upon releasing the application of voltage thereafter.

Therefore, the drive system of the present embodiment may be any one of a static drive (seven segments, etc.), a passive matrix drive, or an active matrix drive.

Moreover, although the display body 2 was fixed to the frame 1A of the display device 1, as shown in FIG. 13, the display body 2 may be of a structure so as to be attachable and detachable to and from the frame 1A. The display body 2 is an extremely thin sheet-shaped or paper-shaped recording medium (electronic paper), and is held between the two pairs of feed rollers 104, 106 disposed in the frame 1A. A rectangular pore 1C is provided to the frame 1A, to which a transparent glass plate 107 is fitted therein. An insertion/removal slot 108 is also provided to the frame 1A so as to enable the insertion and removal of the display body 2 to and from this insertion/removal slot 108. A terminal unit 110 is provided at the tip in the insertion direction of the display body 2, and, by being electrically connected to the socket 112 in the frame 1A, it is connectable to the controller 4 in the frame 1A.

This type of detachable display unit 2 will be easy to handle but not bulky, and, for instance, it would be possible for the user to only carry around the display unit 2 displaying the necessary map near one's destination.

As described above, according to the present invention, the periodic and automatic refresh operation will maintain the memory property of the electronic ink, prevent the deterioration of the picture quality of the display information, and provide a display device with persistency.

With the display device employing the electronic ink according to the present invention, as it will be sufficient to rewrite only the display contents of the pixel in a required minimum upon renewing the display contents, it is possible to provide a display device seeking energy conservation.

Moreover, with the display device employing the electronic ink according to the present invention, it is possible to provide a display device capable of displaying fine gradation with the likes of pulse-surface-area modulation.

Furthermore, the present invention provides the creation of a novel technology of applying a prescribed voltage for retaining the image by maintaining the distribution state of the electrophoretic material in order to prevent the electrophoretic material of the recording medium after voltage application from scattering in the recording medium and not being able to maintain the image. The entire disclosure of Japanese Patent Application 2000-157050, filed May 29, 2000, is herein incorporated by reference.

What is claimed is:

1. A display device having display states which are prescribed by distribution states of particles, the display device comprising:

a plurality of scanning lines and a plurality of data lines that independently apply electric fields in pixel units to the particles; and a drive circuit that includes:

a controller that applies a first electric field of a first polarity to the particles for changing the distribution state thereof into a certain states; and a counter that supplies a count value to the controller for a first period, wherein the controller applies a second electric field of the first polarity to the particles for at least one of maintaining and stabilizing the certain state after the first period.

2. The display device according to claim 1, wherein the particles are contained in a microcapsule together with a liquid for dispersing the particles.

3. The display device according to claim 1, wherein a switching element is disposed in correspondence with the intersection of the plurality of scanning lines and plurality of data lines.

4. The display device according to claim 3, wherein the switching element comprises a semiconductor element.

5. The display device according to claim 4, wherein the semiconductor element comprises a thin film transistor.

6. The display device according to claim 3, wherein the switching element comprises a two-terminal nonlinear element.

7. A recording medium having recorded states that are prescribed by distribution states of particles, the particles dispersed therein between an active matrix substrate and an opposite substrate, comprising:

a plurality of switching elements and a plurality of switching pixel electrodes, the pixel electrode being disposed in correspondence with the switching element and being arranged in an array; and a circuit that applies a first electric field of a first polarity to the particles for changing the distribution thereof into a certain state, and applies a second electric field of the first polarity to the particles for at least one of maintaining and stabilizing the certain state after a first period.

8. The recording medium according to claim 7, wherein the particles are contained in a microcapsule together with a liquid for dispersing the particles.

9. The recording medium according to claim 7, wherein a single pixel is structured of a plurality of sub pixels, and gradation is controlled by pulse-surface-area modulation.

10. The recording medium according to claim 7, wherein the particles are formed of a plurality of charged particles with differing quantities of electric charge.

11. An electrophoretic device, comprising:

a layer including a dispersing media and a plurality of charged particles contained in the dispersing media;

a plurality of scanning lines and a plurality of data lines that independently apply electric fields in pixel units to the particles; and a circuit that includes:

a controller that controls electric fields applied to the layer wherein a distribution state of the particles is defined by the electric field applied thereto; and a counter that supplies a count value to the controller for a first period, wherein the controller is capable of providing the layer with a first electric field of a first polarity for changing the distribution state of the particles into a certain state and a second electric field of the first polarity for at least one of maintaining and stabilizing the certain state after the first period.

12. The electrophoretic device according to claim 11, wherein the particles are contained in a microcapsule together with a liquid for dispersing the particles.

13. An apparatus for driving an electrophoretic device comprising:
- a circuit capable of controlling electric fields applied to a layer in which a dispersing media and a plurality of charged particles are contained; and
- a plurality of scanning lines and data lines that independently apply electric fields in pixel units to the particles;
- wherein the circuit is set to provide the layer with a first electric field of a first polarity for changing the distribution state of the particles into a certain state and a second field of the first polarity for at least one of maintaining and stabilizing the certain state after a first period.

14. The apparatus for driving an electrophoretic device according to claim 13, wherein the particles are contained in a microcapsule together with a liquid for dispersing the particles.

15. A method for driving an electrophoretic device having a plurality of scanning lines and a plurality of data lines that independently apply electric fields in pixel units, comprising the steps of:
- applying a first electric field of a first polarity to a layer including a dispersing media and a plurality of charged particles contained in the dispersing media for writing data;
- counting a setting time for rewriting the data; and
- applying a second electric field of the first polarity to the layer for at least one of maintaining and stabilizing the data when the setting time of the rewriting passes.

16. The method for driving an electrophoretic device according to claim 15, wherein the particles are contained in a microcapsule together with liquid for dispersing the particles.

* * * * *